United States Patent [19]

Kleykamp et al.

[11] 4,453,289
[45] * Jun. 12, 1984

[54] HOSE CLAMP STRUCTURE AND HOSE CONSTRUCTION EMPLOYING SAME

[75] Inventors: Donald L. Kleykamp; Steven G. McCord, both of Washington Township, Montgomery County, Ohio; William J. LiVolsi, Upper Wakefield Township, Bucks County, Pa.; Raymond L. Trueblood, Bethel Township, Miami County, Ohio

[73] Assignee: Dayco Corporation, Dayton, Ohio

[*] Notice: The portion of the term of this patent subsequent to Dec. 22, 1998 has been disclaimed.

[21] Appl. No.: 327,990

[22] Filed: Dec. 7, 1981

Related U.S. Application Data

[63] Continuation-in-part of Ser. No. 137,165, Apr. 4, 1980, Pat. No. 4,306,740.

[51] Int. Cl.³ .............................................. F16L 33/22
[52] U.S. Cl. ..................................... 24/20 TT; 285/39; 285/236; 285/242; 285/DIG. 22; 29/450
[58] Field of Search ................. 24/20 TT, 20 EE, 21, 24/28, 265 A, 274 WB, 284; 285/39, 236, 242, DIG. 22, 252, 253, 420; 29/450

[56] References Cited

U.S. PATENT DOCUMENTS

| 1,454,783 | 5/1923 | Yetter ............................... 24/265 A |
| 3,605,200 | 9/1971 | Vallinotto et al. ............... 24/20 TT |
| 3,874,712 | 4/1975 | Watson ................................ 285/236 |
| 3,925,851 | 12/1975 | Bevans ............................ 24/20 TT |
| 4,128,918 | 12/1978 | Wenk ................................. 24/16 R |
| 4,214,351 | 7/1980 | Wenk .............................. 24/255 SL |
| 4,306,740 | 12/1981 | Kleykemp et al. ............. 24/20 TT |
| 4,312,525 | 1/1982 | Kleykemp et al. ............. 24/20 TT |

*Primary Examiner*—Gene Mancene
*Assistant Examiner*—David I. Tarnoff
*Attorney, Agent, or Firm*—Joseph V Tassone

[57] ABSTRACT

A hose clamp structure and hose construction employing same are provided wherein such structure comprises a pair of cooperating interconnectible members each having a plurality of teeth adapted for interconnecting engagement and wherein the members upon being interconnected around an associated hose end extend substantially over a first arcuate length of the hose end with a second arcuate length of the hose end completing the remaining 360° circumference of such hose end. Each of the members is defined as a separate part and has means for connecting the members to the hose end such that when the members are connected to the hose end the second arcuate length of the hose end is employed as clamping means and the connected members and second arcuate length cooperate to define an annular construction enabling the hose end to be clamped around an associated structure.

40 Claims, 27 Drawing Figures

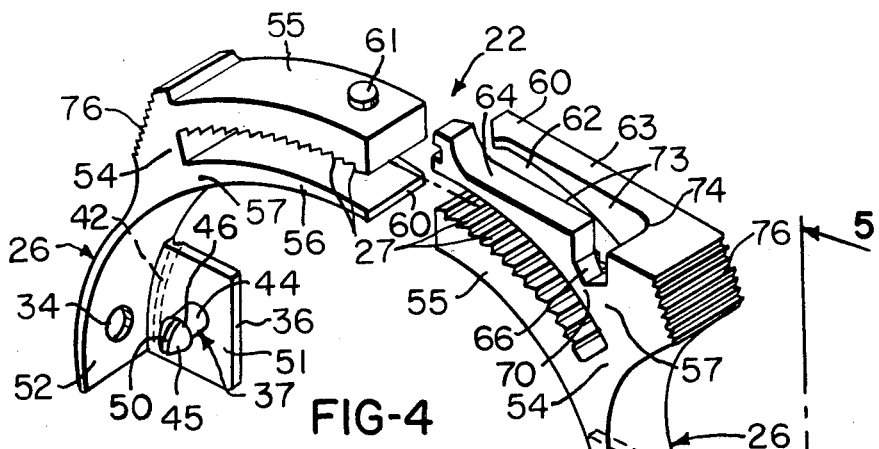
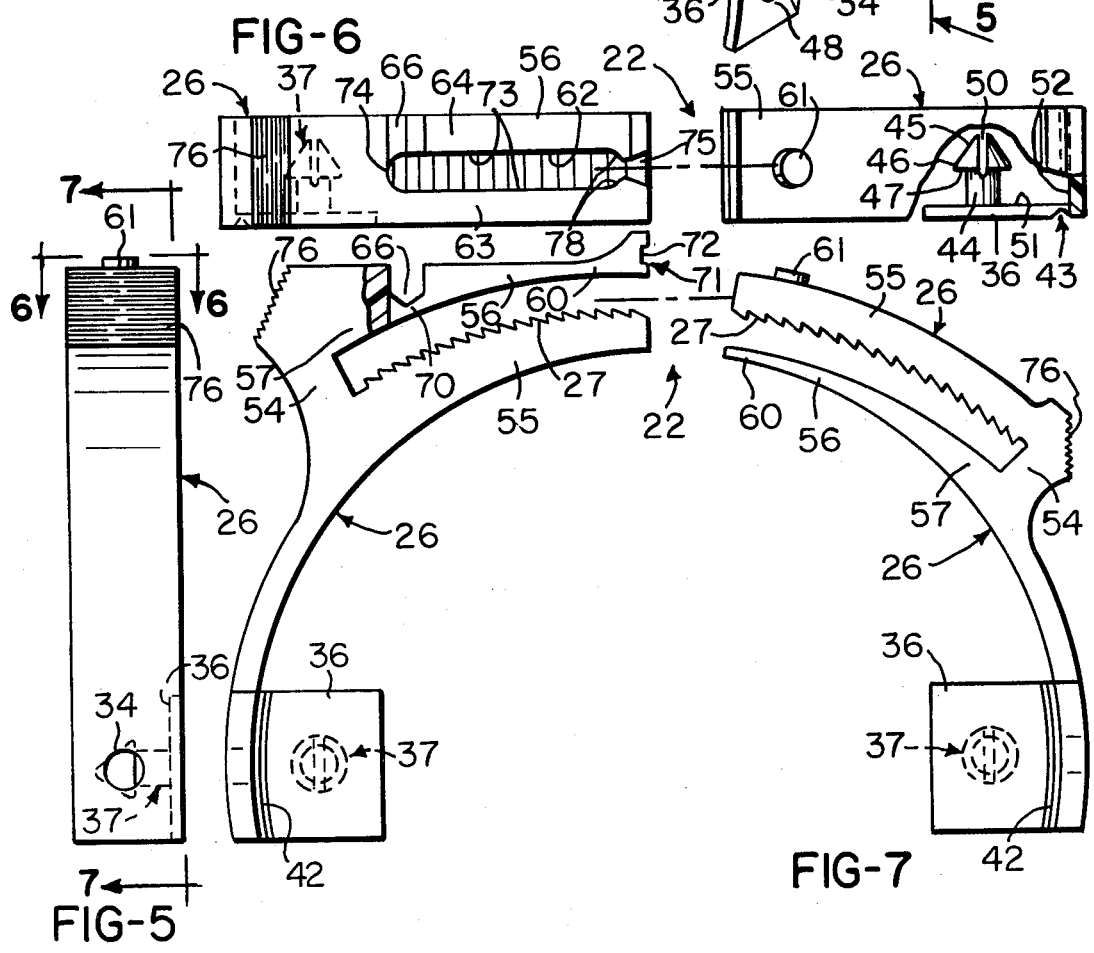

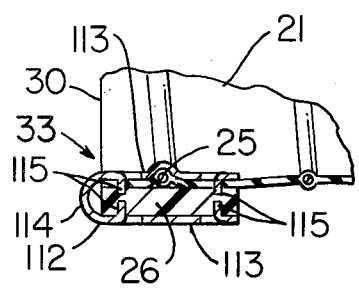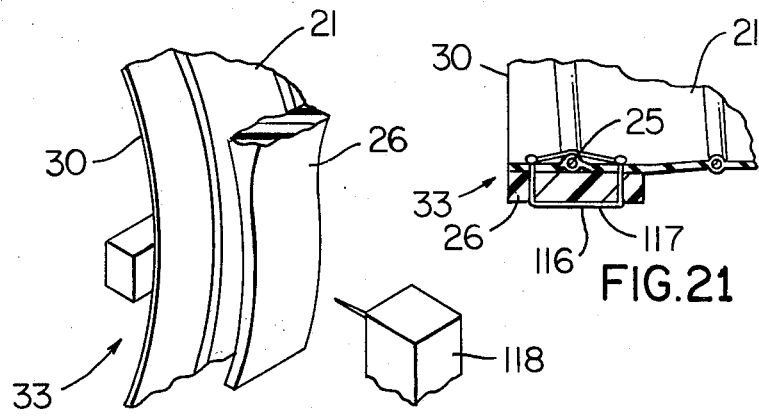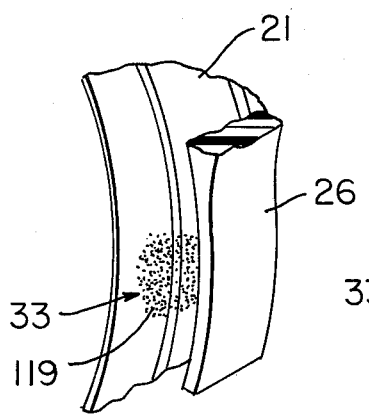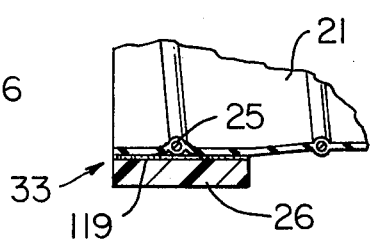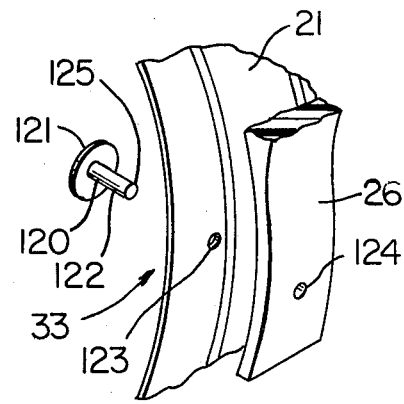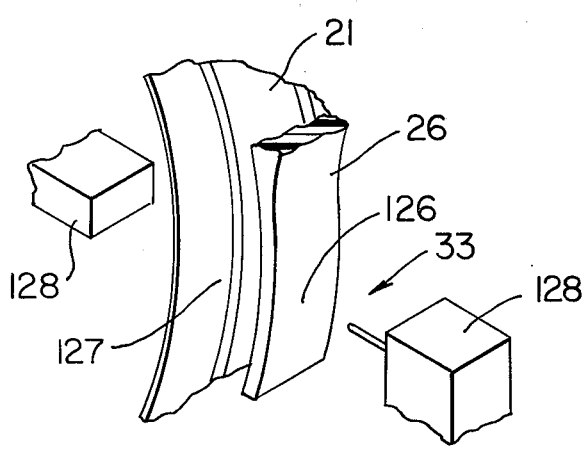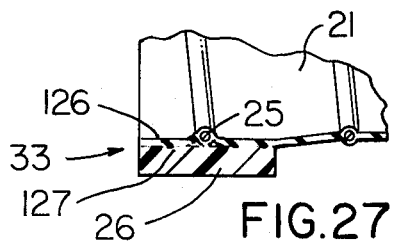

HOSE CLAMP STRUCTURE AND HOSE CONSTRUCTION EMPLOYING SAME

CROSS-REFERENCE TO RELATED PATENT APPLICATION

This application is a continuation-in-part patent application of its copending parent patent application, Ser. No. 137,165, filed Apr. 4, 1980, now U.S. Pat. No. 4,306,740.

BACKGROUND OF THE INVENTION

1. Field of the Invention

This invention relates to a hose clamp structure and to a hose construction employing same.

2. Prior Art Statement

Hose clamps for flexible hose made primarily of polymeric material are well known and widely used throughout industry and many of these hose clamps consist of an adjustable band which is adapted to be disposed around an associated hose end to clamp the hose end around an associated structure, such as, a tubular conduit, or the like. Examples of hose clamps each defined as an adjustable band are shown in U.S. Pat. Nos. 3,605,200, 3,925,851, 4,128,918 and 4,214,351.

It has also been proposed in U.S. Pat. No. 3,874,712 to provide a crimp-on clamp for flexible conduit which has an integral helical wire wherein the clamp uses an over-center toggle link connected to such helical wire.

However, the crimp-on clamp mentioned above is comparatively complex and expensive and is used most efficiently with associated wire-reinforced flexible hose of only one particular size. Similarly, the adjustable band type hose clamp disclosed by the above-mentioned other three patents is only used to clamp hose having a size within a predetermined narrow size range and uses substantial material to surround the hose end thereby adding to the cost thereof.

SUMMARY

It is a feature of this invention to provide a simple and economical hose clamp structure.

Another feature of this invention is to provide a hose clamp structure of the character mentioned which may be provided as an integral part of an overall hose construction.

Another feature of this invention is to provide a hose clamp structure which may be provided as an integral part of a hose construction and which may be readily used with all types of hose constructions including wire-reinforced hose constructions and hose constructions made substantially entirely of polymeric material and without wire reinforcement.

Another feature of this invention is to provide a hose clamp structure of the character mentioned comprised of a pair of cooperating interconnectible members each having a plurality of teeth adapted for interconnecting engagement with such members upon being interconnected around an associated hose end extending substantially over a first arcuate length of the hose end with a second arcuate length of the hose end completing the remaining 360° circumference of the hose end, and wherein each of the members is defined as a separate part and has means for connecting each member to the hose end with the members when connected to the hose end employing the second arcuate length of the hose end as clamping means and with the connected members and second arcuate length cooperating to define an annular construction enabling the hose end to be clamped around an associated structure, such as, a conduit, pipe, nipple, or the like.

Another feature of this invention is to provide a hose clamp structure of the character mentioned in which the means for connecting each member to the hose end comprises an opening in each member adapted to be aligned with a cooperating opening in the hose end, a fastening tab, and a fastener with each fastener being adapted to fasten its member to the hose end by extending through associated aligned openings while fastening its member and tab against opposed surfaces of the hose end.

Another feature of this invention is to provide a hose clamp structure of the character mentioned wherein the pair of cooperating interconnectible members have locking means and means which enables selective locking and unlocking of the locking means without damage to the members.

Another feature of this invention is to provide a hose construction comprising a hose clamp structure to the character mentioned.

Another feature of this invention is to provide a method of making such a hose construction.

Another feature of this invention is to provide a method of making a hose clamp structure of the character mentioned.

Another feature of this invention is to provide a method of attaching a hose construction on an associated conduit employing a hose clamp structure of the character mentioned.

Therefore, it is an object of this invention to provide an improved hose clamp structure, hose construction employing such hose clamp structure, method of making such a hose construction, method of making such hose clamp structure, and method of attaching a hose construction on an associated conduit utilizing improved hose clamp structure having one or more of the novel features of this invention as set forth above or hereinafter shown or described.

Other details, features, uses, objects, and advantages of this invention will become apparent from the embodiments thereof presented in the following specifications, claims, and drawings.

BRIEF DESCRIPTION OF THE DRAWINGS

The accompanying drawings show present preferred embodiments of this invention, in which

FIG. 4 is a view similar to FIG. 2 showing the members of FIG. 2 as viewed from a substantially diametrically opposite direction;

FIG. 5 is a view taken essentially on the line 5—5 of FIG. 4;

FIG. 6 is a view taken essentially on the line 6—6 of FIG. 5;

FIG. 7 is a view taken essentially on the line 7—7 of FIG. 5;

FIG. 19 is a fragmentary cross-sectional view of the completed assembly of FIG. 18;

FIG. 20 is a fragmentary exploded perspective view illustrating a modification of an interconnectible member and its auxiliary means for connecting the same to a flexible hose;

FIG. 21 is a fragmentary cross-sectional view of the completed assembly of FIG. 20;

FIG. 22 is a fragmentary exploded perspective view illustrating a modification of an interconnectible member and its auxiliary means for connecting the same to a flexible hose;

FIG. 23 is a fragmentary cross-sectional view of the completed assembly of FIG. 22;

FIG. 24 is a fragmentary exploded perspective view illustrating a modification of an interconnectible member and its auxiliary means for connecting the same to a flexible hose;

FIG. 25 is a fragmentary cross-sectional view of the completed assembly of FIG. 24;

FIG. 26 is a fragmentary exploded perspective view illustrating a modification of an interconnectible member and its auxiliary means for connecting the same to a flexible hose; and FIG. 27 is a fragmentary cross-sectional view of the completed assembly of FIG. 26.

DETAILED DESCRIPTION

Figure 1:
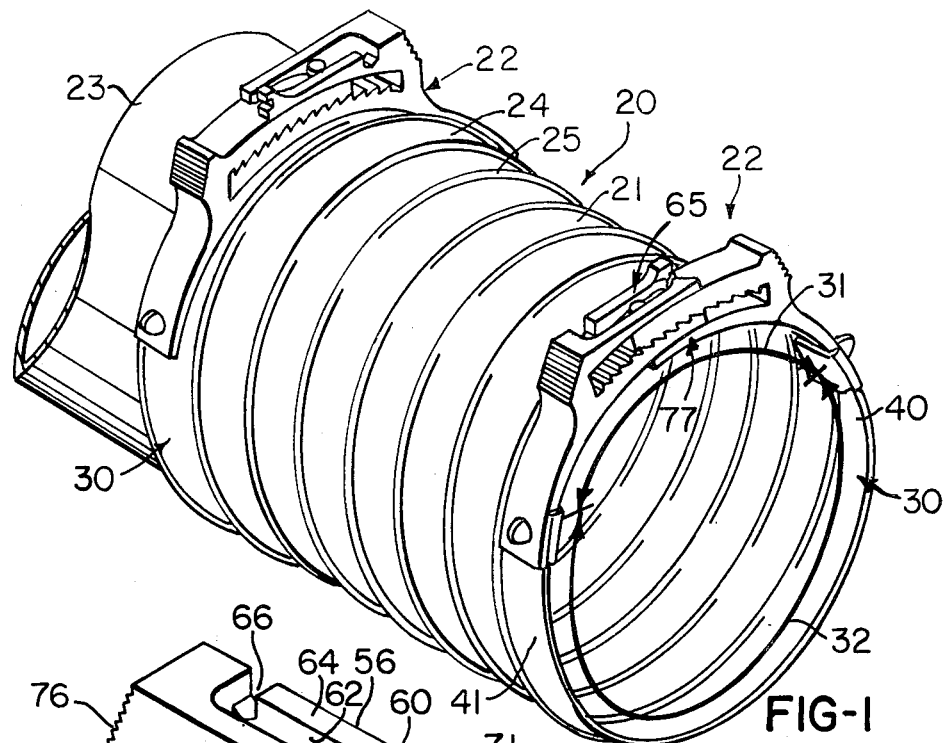
FIG. 1 is a perspective view, with a portion thereof broken away, illustrating an exemplary hose construction which comprises one exemplary embodiment of a hose clamp structure of this invention at each end of a flexible hose of such construction with the hose clamp structure at one end of the flexible hose being used to fasten the hose construction about an associated tubular conduit.

Reference is now made to FIG. 1 of the drawings which illustrates one exemplary embodiment of a hose construction of this invention which is designated generally by the reference numeral 20 and such hose construction comprises a flexible hose 21 made primarily of polymeric material and a pair of hose clamp structures, each designated generally by the same reference numeral 22, at opposite ends thereof. Each hose clamp structure 22 is provided and connected in position as a component portion of the overall hose construction 20 whereby such hose construction may be readily installed on an associated conduit, pipe, nipple, or the like by a comparatively unskilled installer. In this example of the invention one end of the hose construction 20 is shown disposed around an associated end of a tubular conduit 23 and clamped in position by a hose clamp structure 22 and the opposite end (forward end as viewed in FIG. 1) of the construction 20 is shown with a pair of members of structure 22 connected together for purposes of illustration.

The hose 21 may be any hose known in the art which is normally clamped around an associated structure and such hose may be of the type made primarily of polymeric material and with or without reinforcing means. The exemplary hose 21 is a flexible hose which may be made of a polymeric material 24, such as rubber, and has a helical reinforcing means in the form of a helical reinforcing wire 25 provided as an integral part thereof. The helical wire 25 extends along the axial length of the hose 21, as is known in the art, and enables the hose construction 20 to be used in a non-collapsing manner.

Figure 2:
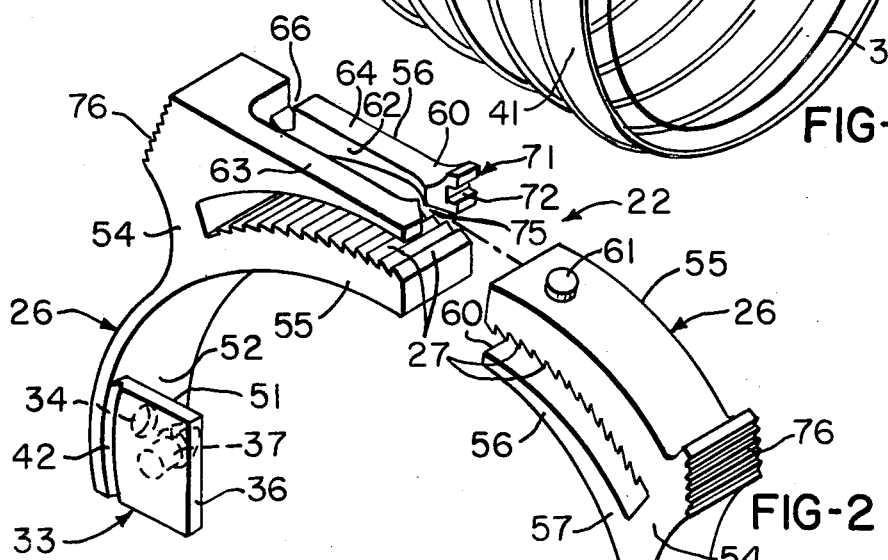
FIG. 2 is a perspective view of a pair of cooperating interconnectible members comprising the hose clamp structure used at each end of the hose construction of FIG. 1 with such members being illustrated independently of their hose construction and oriented substantially in the manner in which they would be oriented upon attachment thereof about a flexible hose comprising their hose construction.

Each hose clamp structure 22 comprises a pair of cooperating interconnectible members, (FIG. 2), designated by the same reference numeral 26, with each member having a plurality of parallel saw-toothed projections or teeth 27 adapted for interconnecting engagement, and the members 26 upon being interconnected around an associated hose end, such as an end 30 at each end of the hose 21, extend substantially over a first arcuate length 31 (FIG. 1) of the hose end 30 with a second arcuate length thereof 32 completing the remaining 360° circumference of the hose end 30. As seen in FIG. 2 of the drawings, each of the members 26 is defined as a separate part and each has means designated generally by the reference numeral 33 for connecting the member 26 to the hose end 30. The members when connected to the hose end 30 employ the second arcuate length 32 as clamping means whereby the connected members 26 and second arcuate length 32 cooperate to define what may be considered an annular construction and such annular construction enables the hose end 30 to be clamped around an associated structure, such as the conduit 23 illustrated in FIG. 1.

The means 33 for connecting each member 26 to the hose end 30 comprises an opening 34 in the member 26 (FIGS. 2 and 4) which is adapted to be aligned with a cooperating opening 35 in the hose end 30 (FIG. 3), a fastening tab 36, and a fastener 37. Each fastener 37 is adapted to fasten its member 26 to the hose end 30 by extending through associated aligned openings 34 and 35 while fastening such member 26 and tab 36 against opposed surfaces 40 and 41 of the hose end 30, and as shown in FIG. 1.

Each member 26 of the exemplary embodiment of the invention illustrated in FIGS. 1–7 is preferably defined of a polymeric material in the form of a synthetic plastic material which is capable of being injection molded and has flexibility and resiliency. The exemplary member 26 of FIGS. 1–7 has its fastening tab 36 and fastener 37 defined as an integral part of the member 26 as a single-piece construction with each fastening tab 36 and fastener 37 being hingedly fastened to an associated member along an arcuate hinge connection or hinge 42. As seen as 43 in FIG. 6, each arcuate hinge connection 42 allows sufficient space to accommodate the thickness of an associated hose end 30 whereby it is a simple matter to define an associated opening 35 (by punching, or the like) in the hose end 30 whereupon the fastener is inserted through the opening 35 and through the opening 34 which is aligned with opening 35 to thereby self hold the member 26 in position utilizing its integral fastener 37. The fastening action is achieved merely by bending or folding the fastening tab 36 about its arcuate hinge 42 until the head of the fastener 37 extends through the openings 34 and 35 whereupon the fastener is self held or self fastened in position, and as will be apparent from the following description.

Each fastener 37 of FIGS. 1–7 is preferably defined of the same resilient polymeric material utilized to make its associated member 26 and such fastener comprises a cylindrical rod-like portion 44 (FIG. 4) of a particular diameter which is less than the diameter of the opening 34 in its member and the fastener 37 has a substantially conical head 45 which has a base 46 (FIG. 6) of a diameter which is substantially larger than the diameter of the rod-like portion 44 and larger than the diameter of the opening 34 to thereby define an annular retaining shoulder 47 at the terminal outer end of the rod-like portion. The conical head 45 has at least one axial slit 50 therethrough which enables the conical head 45 to be compressed radially inwardly for insertion of the base 45 thereof through the opening 34 in an associated member 26 after insertion through an aligned opening 35 in the hose end 30. The resilient character of the material defining the member 26 and fastener 37 serves to restore the conical head 45 of such fastener to its configuration prior to compression of the head radially inwardly thereby enabling the retaining shoulder 47 to, in essence, engage an outwardly facing annular portion 48 of the member 26 which surrounds the opening 34 for fastening purposes, and as seen in FIG. 4.

Each member 26 and its fastening tab 36 has integral gripping means for gripping a portion of the hose end and such integral gripping means in this example comprises friction means in the form of the friction surface 51 (FIG. 6) provided on the inside surface of fastening tab 36 and a cooperating friction surface 52 provided on a radially inwardly facing portion of the member 26.

Referring now to FIG. 7 of the drawings it will be seen that each connectible member 26 comprises a support portion which will be referred to as support portion 54, an arcuate jaw 55, and a resilient biasing tongue 56. Each jaw 55 and tongue 56 is supported in a cantilevered manner from an associated support portion 54 with each jaw having the plurality of teeth 27 defined therein as an integral part thereof. The resilient biasing tongues 56, upon interconnecting the cooperating pair of members 26, urge the jaws 55 toward each other to maintain the jaw teeth 27 in toothed engagement. Each tongue 56 tapers from a base portion 57 thereof which adjoins the support 54 to a comparatively flexible terminal end portion 60 and the radially innermost tongue of the members 26 in their interlocked relation is sufficiently tapered and cooperates with the opposed interconnected member to form a substantially semicylindrical continuous inner surface in any interconnected position of a pair of members 26.

As seen in FIGS. 4 and 6 of the drawings one of the jaws 55 has a projection extending substantially radially therefrom and such projection is a substantially cylindrical projection 61 disposed perpendicular to the one jaw.

The tongue 56 of the opposite member 26 which is disposed outwardly of its hose end has an axial slot 62 therein defining the one tongue as a bifurcate tongue with two prongs 63 and 64 (FIGS. 4 and 6). The slot 62 is adapted to receive the projection 61 therewithin with the members 26 interconnected and the projection 61 and prongs 63 and 64 define locking means designated generally by the reference numeral 65 in FIG. 1. The locking means 65 serves to hold the toothed jaws 55 interconnected by holding such jaws against movements parallel to the crests of the teeth 27 and hence parallel to the longitudinal axis of the hose construction 20.

The locking means 65 may be selectively locked and unlocked, as will now be explained, with particular reference being made to FIGS. 4 and 7. The prong 64 has a cutout 66 in its base portion 57 which allows a substantially radial flexing movement thereof with the members 26 interconnected. This radial flexing movement is facilitated because of a comparatively thin portion 70 at the base portion 57 of the prong 64 which allows such prong to be moved a radial distance which is slightly greater than the axial length of the cylindrical rod-like projection 61 and with the prong 64 thus radially outwardly displaced it is a simple matter to slide apart the connected members 26 substantially parallel to the axis of the crests of the teeth 27 and hence parallel to the longitudinal axis of the hose construction 20 and thereby disconnect the members 26 without damage thereto. The prong 64 has means 71 in its terminal end enabling easy gripping thereof and such means 71 comprises a slot 72 which is particularly adapted to receive the end of a hand tool (a screw driver, for example) a fingernail, or the like, to provide flexing movement of the prong 64 for the purpose previously described.

The slot 62 provided in the finger 56 is of substantially oval outline defined by parallel opposed surfaces 73 on the prongs 63 and 64 with an arcuate surface 74 at the inner end of the slot 62 and an inwardly tapering entrance 75 into the slot 62 which is particularly adapted to receive the projection 61 therewithin and provide locking of the members 26 into position as the outer teeth 27 of the jaws 55 are brought into engagement, and in this manner assure that the members 26 are initially held together even with only a few teeth engaged. As the first teeth of members 26 are first interconnected, the projection 61 enters the entrance 75 to the slot 62 causing the prongs 63 and 64 to be initially flexed away from each other and once projection 61 enters the main width of the slot 62 the prongs 63 and 64 snap toward each other to their unflexed positions and as illustrated in FIG. 6 causing transition surfaces 78 between the entrance 75 and slot 62 to engage projection 61 and prevent separating movements of the members 26.

The members 26 may also be provided with corrugated surfaces 76, or the like, adjoining the upper parts of their support portions 54. The surfaces 76 facilitate either manual grasping or grasping by a hand tool, such as pliers, to enable urging of the members 26 toward each other for interconnecting purposes.

The teeth 27 provided on the jaws 55 have only been described in general terms and the construction of such teeth may be in accordance with any suitable construction known in the art. For example, the construction of teeth 27 as well as the detailed construction of jaws 55 and the taper of the radially innermost tongue 56 (with the members 26 in their connected relation) may be essentially as disclosed in the previously mentioned U.S. Pat. No. 4,128,918. Further, the members 26 may be made of flexible resilient plastic materials as disclosed in this patent and the materials disclosed in this patent and the details of the jaws 55, teeth 27, construction of the innermost tongue such as the tongue 56 shown at 77 in FIG. 1, may be as disclosed in this patent whereby as to these items the disclosure in the patent is incorporated herein by reference thereto.

Figures 3, 8, 9:
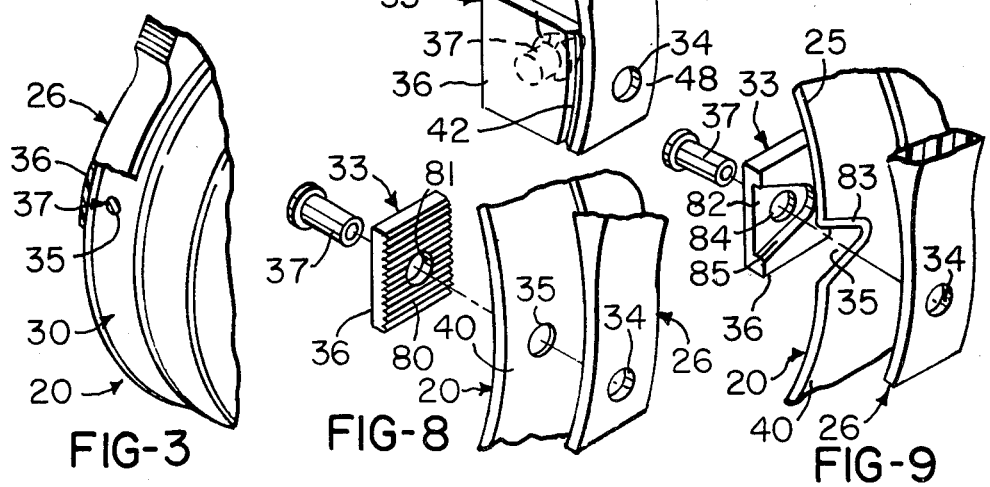
FIG. 3 is a fragmentary view with a part of a typical one of the two interconnectible members in cross section, illustrating an opening in the hose end which is used in connecting the interconnectible member to such hose end.
FIG. 8 is a fragmentary perspective view illustrating a modification of an interconnectible member and its auxiliary means for connecting same to a flexible hose.
FIG. 9 is a view similar to FIG. 8 illustrating another modification of an interconnectible member and its auxiliary means for connecting same to a flexible wire-reinforced hose.

Reference is now made to FIGS. 8 and 9 of the drawings which illustrate modifications of the hose clamp structure of this invention wherein each member 26 thereof has modified connecting means 33 for connecting each member 26 to an associated hose end such as the hose end 30 of the hose 21. As before, the connecting means 33 for each member 26 comprises an opening, 34, a fastening tab 36, and a fastener 37; however, it will be seen that the tab 36 and fastener 37 are defined as separate or auxiliary parts in these modifications whereby the connecting means 33 for the modifications of FIGS. 8 and 9 are auxiliary connecting means 33.

In the FIG. 8 modification, instead of a plain friction surface defining the gripping means such gripping means is provided in the form of saw-toothed projections 80. The saw-toothed projections are particularly adapted to be urged against the inside surface 40 of the hose 21 to prevent slippage thereof. In addition, the teeth 80 may be urged against wire turns of the helical wire 25 defining the hose construction 21 to thereby also use the strength of the helical wire to help fasten the associated member 26 in position and further assure the efficient utilization of the arcuate length 32 of the hose end 30 as a portion of the clamping means. Each member 26 is installed in position on the hose end 30 by placing the openings 34 and 35 in the member 26 and hose 21 respectively in aligned relation whereupon the fastener 37 (in the form of a standard rivet) is installed in position through such openings and through an opening 81 in the tab 36 and riveted in position as is known in the art.

In the FIG. 9 modification of the hose clamp structure the fastening tab 36 and fastener 37 are also provided separate from their associated member 26. However, the fastening tab 36 has a cutout 82 therein which is particularly adapted to receive a convolution 83 which is defined in the helical wire reinforcement 25 comprising the hose end 30 of the hose construction 21. The convolution 83 helps hold its associated member 26 in position and in a similar manner as described previously enables application of substantial clamping forces through the arcuate length 32 of the hose end 30. For example, the cutout 82 is such that the helical wire 25, even though covered with the polymeric material defining the hose 21, nestles within an arcuate surface 85 defining the separate fastening tab 36 whereby the arcuate surface 85 enables application of even greater clamping forces through the utilization of the helical wire 25 provided in the outer portion 30. It will also be noted that the fastener 37 extends through an associated opening 84 in the tab 36, through a hose opening 35 (roughly triangular in shape in this illustration of FIG. 9) and through an associated opening 34 in the member 26. The fastener 37 of this embodiment may also be in the form of a fastening rivet.

Each fastener 37 may be in the form of the usual rivet made of a metallic material and riveted in position utilizing a standard riveting tool, or the like. In addition, each separate fastener may be similar to the integral fastener of FIGS. 1-7 and provided with a flat head at one end and a split conical head 45 at its opposite end to enable installation thereof without a riveting tool, or the like. Also, each fastener 37 of FIGS. 8 and 9 may be defined as an integral part of its separate tab 36.

Other modifications of the hose clamp structure of this invention are illustrated in FIGS. 10-27, each modification having modified auxiliary connecting means 33 for connecting each member 26 to an associated hose end such as the hose end 30 of the hose 21. However, FIGS. 10-27 illustrate only one member 26 being interconnected to the hose end 30 of the hose 21 with the understanding that the other cooperating member 26 for the hose end 30 of the hose 21 will be connected in a like manner. Of course, if desired, each member 26 for the hose end 30 of the hose 21 could be connected in a different manner if desired, the important feature being that the two members 26 for each hose end 30 cooperate to perform the clamping structure in the manner previously set forth.

Figure 10:
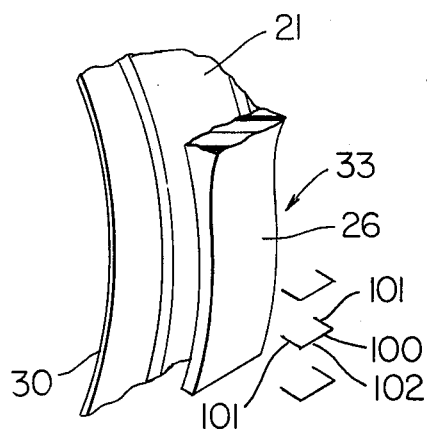
FIG. 10 is a fragmentary exploded perspective view illustrating a modification of an interconnectible member and its auxiliary means for connecting the same to a flexible hose.
Figure 11:
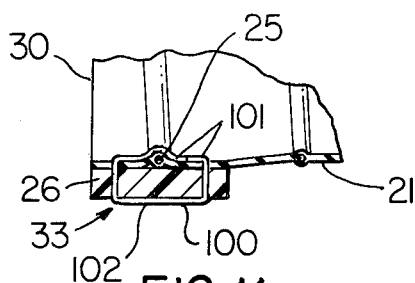
FIG. 11 is a fragmentary cross-sectional view of the completed assembly of FIG. 10.

In the FIGS. 10 and 11 modification, the member 26 is secured to the hose end 30 of the hose 21 by at least one staple 100, formed of metal, plastic or any other suitable material, that has the legs 101 thereof penetrate through the member 26 and hose 21 and be turned over in the manner illustrated in FIG. 11 in a conventional manner. Obviously, the staple 100 could initially be disposed on the inside of the hose 21 and have the legs 101 thereof penetrate through the hose 21 and then into the member 26 to be turned over against the member 26 rather than against the inside surface of the hose 21 as illustrated in FIGS. 10 and 11. In any event, suitable stapling apparatus (not shown) can be utilized in a conventional manner to staple the member 26 to the hose 21.

In addition, the hose end 30 and member 26 can be so associated that the staple 100 will surround or overlap part of the reinforcing wire 25 of the hose 21 so that the staple 100 not only staples the member 26 to the hose 21, but also staples the member 26 to the reinforcing wire 25 in a manner believed to enhance the securement of the member 26 to the hose 21.

While the staple 100 illustrated in FIGS. 10 and 11 has the cross member 102 thereof disposed substantially transverse to the longitudinal axis of the member 26, it is to be understood that the cross member 102 of the staple 100 could be disposed parallel to the longitudinal axis of the member 26 or at any angle relative thereto as desired.

Thus, it can be seen that the auxiliary connecting means 33 in the modification of FIGS. 10 and 11 comprises staple means 100 which staple the members 26 to the hose 21, the stapled members 26 providing the clamping function with hose end 30 in the manner previously set forth.

Figure 12:
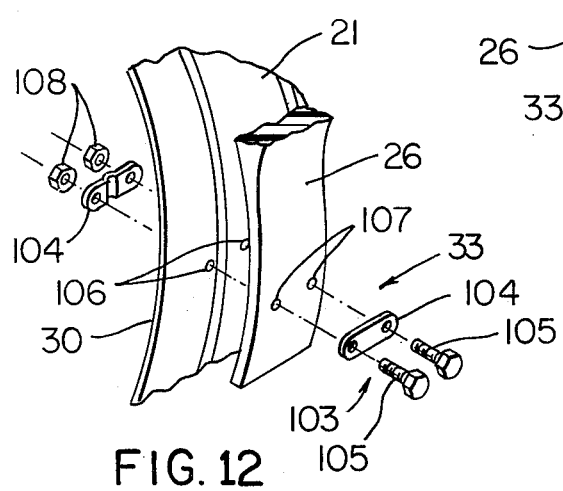
FIG. 12 is a fragmentary exploded perspective view illustrating a modification of an interconnectible member and its auxiliary means for connecting the same to a flexible hose.
Figure 13:
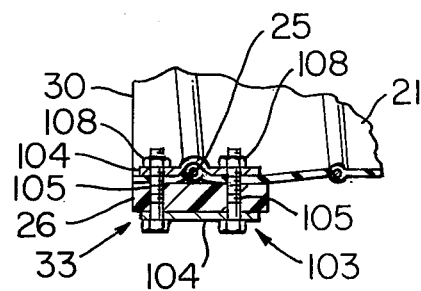
FIG. 13 is a fragmentary cross-sectional view of the completed assembly of FIG. 12.

In the modification illustrated in FIGS. 12 and 13, the auxiliary clamping means 33 comprises at least one clamping device that is generally indicated by the reference numeral 103 and comprises two members 104, formed of metallic material, plastic material or any other suitable material, and respectively being disposed adjacent the inside of the end 30 of the hose 21 and outboard of the member 26 to be interconnected together by fastening members 105 respectively passing through suitable openings 106 and 107 respectively formed in the hose 21 and member 26 to clamp the member 26 to the end 30 of the hose 21. For example, the fastening members 105 can comprise threaded fastening members and utilize nuts 108 on opposite ends thereof to sandwich the hose end 30 and member 26 between the members 104 in a conventional clamping manner as the nuts 108 are tightened against the member 104.

If desired, the hose end 30 can have the reinforcing wire 25 and member 26 so arranged that the clamping means 103 overlaps part of the reinforcing wire 25 to thereby clamp the member 26 to the reinforcing wire 25 in a manner believed to further assist in the securement of the member 26 to the hose end 30 of the hose 21.

While the clamping members 104 are illustrated as being disposed substantially transverse to the longitudinal axis of the member 26, it is to be understood that the members 104 could be disposed parallel to the longitudinal axis of the member 26 or at any angle relative thereto as desired.

Also, it is to be understood that while the reinforcing wires 25 of the hose 21 have been illustrated in FIGS. 10-13 as being overlapped by the staple 100 and clamp 103, as well as in FIGS. 16-27 as hereinafter set forth, it is to be understood that the auxiliary connecting means 33 of this invention can be utilized to secure the members 26 to the hose end 30 of the hose 21 at points intermediate the coils of the reinforcing wire 25 if desired. In addition, the hose 21 can be provided without any wire reinforcing means 25 as previously set forth.

Figure 14:
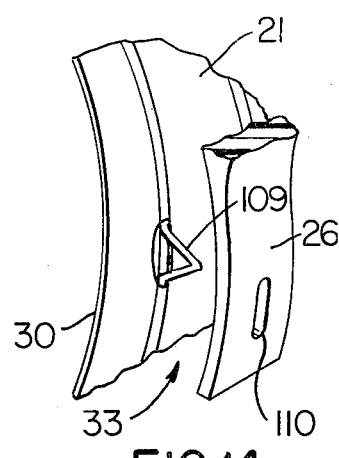
FIG. 14 is a fragmentary exploded perspective view illustrating a modification of an interconnectible member and its auxiliary means for connecting the same to a flexible hose.
Figure 15:
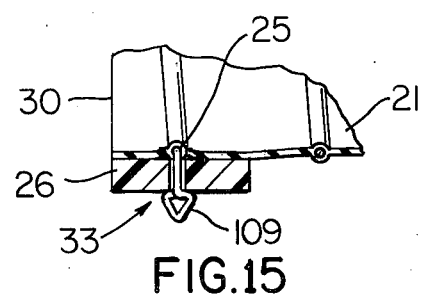
FIG. 15 is a fragmentary cross-sectional view of the completed assembly of FIG. 14.

In the modification of FIGS. 14 and 15, the auxiliary connecting means 33 comprise a portion or part 109 of the reinforcing wire 25 of the hose end 30 of the hose 21 which has been forced through an opening 110 in the member 26 when the member 26 is disposed flush against the hose 21 as illustrated in FIG. 15. Thereafter, the wire part 109 is twisted over the member 26 to wire the member 26 directly to the hose 21.

Figure 16:
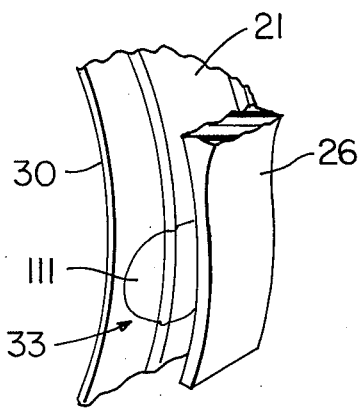
FIG. 16 is a fragmentary exploded perspective view illustrating a modification of an interconnectible member and its auxiliary means for connecting the same to a flexible hose.
Figure 17:
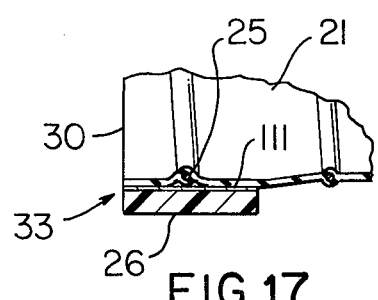
FIG. 17 is a fragmentary cross-sectional view of the completed assembly of FIG. 16.

In the modification of FIGS. 16 and 17, the auxiliary connecting means 33 comprises a hot melt adhesive means 111 that is disposed between the cooperating surfaces of the hose 21 and member 26, the hot melt adhesive 111 being placed on one or both of the members 21 and 26 and thereby securing the same together as illustrated in FIG. 17 when the hot melt adhesive means 111 solidifies in a conventional manner for hot melt adhesive applications. Of course, if the material of the hose 21 and/or member 26 itself can be heated to form an adhesive action therefrom, then such melted portion and subsequent solidification thereof would comprise the auxiliary hot melt adhesive means 111 rather than require a separate source therefor as illustrated in FIGS. 16 and 17.

As illustrated in FIGS. 16 and 17, the hot melt adhesive means 111 overlaps part of the reinforcing wire 25 to thereby secure the member 26 also to the wire reinforcing means 25 in a manner believed to enhance the securement of the member 26 to the hose 21.

Figure 18:
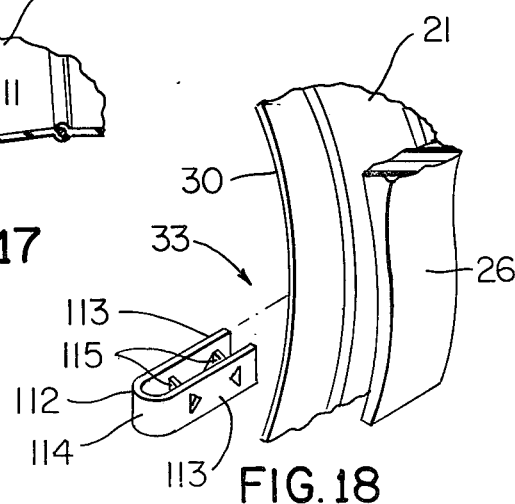
FIG. 18 is a fragmentary exploded perspective view illustrating a modification of an interconnectible member and its auxiliary means for connecting the same to a flexible hose.

In the modification illustrated in FIGS. 18 and 19, the auxiliary connecting means 33 comprises at least one clip 112, formed of metal, plastic or any other suitable material, which in the embodiment illustrated in FIGS. 18 and 19 comprises a U-shaped one-piece member having substantially parallel legs 113 hinged together by a yoke portion 114 which is adapted to straddle the hose end 30 so as to place one leg 113 inside the hose 21 and the other leg 113 outboard of the member 26 so that subsequently forcing the legs 113 toward each other with suitable apparatus (not shown) will cause interlocking teeth 115 on the clip 112 to penetrate and grip the hose 21 and member 26 in a manner to clip the member 26 directly to the hose 21 as illustrated in FIGS. 18 and 19.

In addition, it can be seen that the clip 112 also overlaps a part of the reinforcing wire 25 of the hose 21 and thereby clips the member 26 to the reinforcing wire 25 as well as to the hose 21 in a manner believed to further enhance the securement of the member 26 to the hose 21.

In the modification illustrated in FIGS. 20 and 21, the auxiliary connecting means 33 comprises at least one stitch 116 of a thread 117 sewn through the member 26 and hose 21 at the hose end 30 thereof by suitable sewing apparatus 118, the thread 117 being formed of metallic material, plastic material or any other suitable material which would have sufficient strength to secure the member 26 to the hose 21 as illustrated.

As illustrated in the FIGS. 20 and 21, it can be seen that the stitches 116 overlap a part of the reinforcing wire 25 of the hose 21 so that the member 26 is also sewn to the reinforcing wire 25 as well as to the hose 21 in a manner believed to further enhance the securement of the member 26 to the hose 21.

In the modification illustrated in FIGS. 22 and 23, the auxiliary connecting means 33 comprises a suitable adhesive means or glue 119 disposed between the hose 21 and the member 26 to secure the member 26 to the hose 21 when the adhesive means 119 sets in a manner conventional for the particular adhesive means utilized, the adhesive means 119 being initially placed on the hose 21 and/or member 26 so that when the member 26 and hose 21 are brought together the adhesive means 119 will secure the same together in a manner conventional in the art of gluing or the like.

As illustrated in FIGS. 22 and 23, the adhesive means 119 overlaps a part of the reinforcing wire 25 of the hose 21 so that the member 26 is secured by the adhesive means 119 to the reinforcing wire 25 as well as to the hose 21 in a manner believed to further enhance the securement of the member 26 to the hose 21.

In the modification illustrated in FIGS. 24 and 25, the auxiliary connecting means 33 comprises at least one rivet 120 having an enlarged head 121 and a thin cylindrical body 122 adapted to be disposed through aligned openings 123 and 124 respectively formed through the hose 21 and member 26 so that the end 125 of the rivet 120 can be peened over in a conventional manner for riveting to rivet the member 26 to the hose end 30 of the hose 21 as illustrated in FIGS. 24 and 25, the enlarged head 121 and formed end 125 being so arranged relative to the reinforcing wire 25 of the hose 21 that the same overlap a part of the reinforcing wire 25 in a manner believed to thereby rivet the member 26 to the wire 25 as well as to the hose 21 and thereby enhance the securement of the member 26 to the hose 21.

In the modification illustrated in FIGS. 26 and 27, the auxiliary connecting means 33 comprises ultrasonic welded portions 126 and 127 respectively of the hose 21 and the member 26 that has been provided by conventional ultrasonic welding apparatus 128 that ultrasonically welds the portions 126 and 127 of the hose 21 and member 26 together in a manner well known in the ultrasonic welding art or the like.

As illustrated in FIGS. 26 and 27, the ultrasonic welded portions 126 and 127 of the hose 21 and member 26 overlap a part of the reinforcing wire 25 so that member 26 is welded to the reinforcing wire 25 in a manner believed to enhance the securement of the member 26 to the hose 21.

Therefore, it can be seen that in the modifications of this invention illustrated in FIGS. 8-27, auxiliary connecting means 33 can be provided for securing the members 26 to the hose 21 without requiring the connecting means 33 to be initially integral and one-piece with the member 26. Further, it can be seen that the auxiliary connecting means 33 of this invention can utilize a part of the reinforcing wire 26 in a manner believed to enhance the securement of the member 26 to the hose 21 as previously set forth.

Thus, it is seen that in accordance with the teachings of this invention, an improved hose clamp structure is provided comprised of a pair of cooperating interconnectible members 26, as described. In addition, an improved method of making such a hose clamp structure comprised of a pair of cooperating interconnectible members is provided. Also, a hose construction utilizing a hose clamp structure of the character mentioned is provided. Also, a method of making such a hose construction is provided. Finally, this invention teaches the provision of an improved method of attaching a hose on an associated conduit, pipe, or nipple, employing a hose clamp structure comprised of a pair of cooperating interconnectible members as described herein and wherein the connecting steps comprise punching or otherwise defining a pair of openings 35 at approximately diametrically opposite positions on a hose 21 to be clamped whereupon each member 26 is fastened in position utilizing an opening 35 in the hose and utilizing associated connecting means 33, whether such connecting means 33 is defined as an integral part of the overall member 26 or whether such connecting means is auxiliary and thereby comprised of separate parts, such as including a separate fastening tab and fastener, or staples, or clamps, or clips, or stitches, etc., as illustrated in FIGS. 8-27.

The hose clamp structure of this invention is especially useful when provided with a flexible conduit made primarily of polymeric material and such conduit may be substantially unreinforced or may be reinforced by suitable reinforcing means, including a helical wire, or the like. Further, the outer portion of such helical wire, including the outer turns thereof may be used to help attach members 26 of the associated hose clamp structure in position so as to enable the exertion of great clamping forces employing the arcuate length 32 of the hose 21 which is remote from the interconnected members 26 of the hose clamp structure.

While present exemplary embodiment of this invention, and methods of practicing the same, have been illustrated and described, it will be recognized that this invention may be otherwise variously embodied and practiced within the scope of the following claims.

What is claimed is:

1. In a hose construction comprising a hose made primarily of polymeric material and having opposite hose ends, a hose clamp structure connected to at least one of said hose ends, the improvement wherein said hose clamp structure comprises a pair of interconnectible members each having a plurality of teeth adapted for interconnecting engagement, said members upon being interconnected around said one hose end extending substantially over a first arcuate length of said one hose end with a second arcuate length of said one hose end completing the remaining 360 degree circumference of said one hose end, each of said members being defined as a separate part, auxiliary connecting means connecting each member to said one hose end whereby each said auxiliary connecting means initially was separate from its respective member, said members when connected to said one hose end employing said second arcuate length of said one hose end as clamping means, said connected members and second arcuate length cooperating to define an annular construction enabling said one hose end to be clamped around an associated structure.

2. A hose construction as set forth in claim 1 wherein said auxiliary connecting means for each said member comprises at least one staple that staples that said member to said hose end.

3. A hose construction as set forth in claim 2 wherein said hose has reinforcing wire means, each said staple surrounding part of said wire means to staple that said part to that said member.

4. A hose construction as set forth in claim 1 wherein said auxiliary connecting means for each said member comprises at least one clamp that clamps that said member to said hose end.

5. A hose construction as set forth in claim 4 wherein said hose has reinforcing wire means, each said clamp overlapping part of said wire means to clamp that said part to that said member.

6. A hose construction as set forth in claim 1 wherein said hose construction has reinforcing wire means, said auxiliary connecting means for each said member comprises part of said wire means that wires that said member to said hose end.

7. A hose construction as set forth in claim 6 wherein each said member has opening means passing therethrough, said wire means respectively having said parts thereof extending through said opening means of said members to wire said members to said hose end.

8. A hose construction as set forth in claim 1 wherein said auxiliary connecting means for each said member comprises hot melt adhesive means that secures that said member to said hose end.

9. A hose construction as set forth in claim 8 wherein said hose has reinforcing wire means, each said adhesive means overlapping part of said wire means to secure that said part to that said member.

10. A hose construction as set forth in claim 1 wherein said auxiliary connecting means for each said member comprises at least one metal clip that clips that said member to said hose end.

11. A hose construction as set forth in claim 10 wherein said hose has reinforcing wire means, each said clip overlapping part of said wire means to clip that said part to that said member.

12. A hose construction as set forth in claim 1 wherein said auxiliary connecting means for each said member comprises at least one sewing stitch that stitches that said member to said hose end.

13. A hose construction as set forth in claim 12 wherein said hose has reinforcing wire means, each said stitch overlapping part of said wire means to stitch that said part to that said member.

14. A hose construction as set forth in claim 1 wherein said auxiliary connecting means for each said member comprises adhesive means that secures that said member to said hose end.

15. A hose construction as set forth in claim 14 wherein said hose has reinforcing wire means, each said adhesive means overlapping part of said wire means to secure that said part to that said member.

16. A hose construction as set forth in claim 1 wherein said auxiliary connecting means for each said member comprises at least one rivet that rivets that said member to said hose end.

17. A hose construction as set forth in claim 16 wherein said hose has reinforcing wire means, each said rivet overlapping part of said wire means to rivet that said part to that said member.

18. A hose construction as set forth in claim 1 wherein said auxiliary connecting means for each said member comprises ultrasonically welded together portions of said hose and that said member that secures that said member to said hose end.

19. A hose construction as set forth in claim 18 wherein said hose has reinforcing wire means, each said welded portions overlapping part of said wire means to weld that said part to that said member.

20. In a method of making a hose construction for attachment on an associated tubular construction by disposing a hose end of said hose construction around said tubular construction and attaching said hose end against said tubular construction with a hose clamp structure, the improvement comprising the steps of, providing a pair of cooperating interconnectible members which define said hose clamp structure and with each of said interconnectible members having a plurality of teeth adapted for interconnecting engagement, and connecting each of said members to said hose end with associated connecting means so that said members can extend substantially over a first arcuate length of the hose end with a second arcuate length of said hose end completing the remaining 360° circumference of said hose end, said member being adapted to be connected by urging the teeth thereof in connecting engagement and said members when connected employing the second arcuate length of said hose end as clamping means, said connected members and second arcuate length cooperating to define an annular construction enabling said hose end to be clamped around said tubular construction in an optimum manner.

21. A method as set forth in claim 20 wherein said step of connecting each of said members to said hose end with associated connecting means comprises the step of forming said connecting means to include the respective member.

22. A method as set forth in claim 20 wherein said step of connecting each of said members to said hose end with associated connecting means comprises the step of forming said connecting means to include an auxiliary connecting means that initially was separate from its respective member.

23. A method as set forth in claim 22 wherein said step of connecting each of said members to said hose end comprises the step of stapling each said member to said hose end with at least one staple whereby said staples comprise said auxiliary connecting means.

24. A method as set forth in claim 23 wherein said step of stapling causes said staple for each said member to surround part of a wire reinforcing means of said hose to thereby staple that said one member to that said part of said wire reinforcing means.

25. A method as set forth in claim 22 wherein said step of connecting each of said members to said hose end comprises the step of clamping each said member to said hose end with at least one clamp whereby said clamps comprise said auxiliary connecting means.

26. A method as set forth in claim 25 wherein said step of clamping causes said clamp for each said member to overlap part of a wire reinforcing means of said hose to thereby clamp that said one member to that said part of said wire reinforcing means.

27. A method as set forth in claim 22 wherein said step of connecting each of said members to said hose end comprises the step of wiring each said member to said hose end with a part of the wire reinforcing means of said hose whereby said parts of said wire reinforcing means comprise said auxiliary connecting means.

28. A method as set forth in claim 27 wherein said step of wiring comprises the steps of forming opening means through each said member, extending said parts of said wire reinforcing means respectively through said opening means of said members, and, thereafter, twisting said parts of said wire reinforcing means to lock said members to said hose end.

29. A method as set forth in claim 22 wherein said step of connecting each of said members to said hose end comprises the step of securing each said member to said hose end with hot melt adhesive means whereby said hot melt adhesive means comprise said auxiliary connecting means.

30. A method as set forth in claim 29 wherein said step of securing causes said hot melt adhesive means for each said member to overlap part of a wire reinforcing means of said hose to thereby secure that said one member to that said part of said wire reinforcing means.

31. A method as set forth in claim 22 wherein said step of connecting each of said members to said hose end comprises the step of clipping each said member to said hose end with at least one clip whereby said clips comprise said auxiliary connecting means.

32. A method as set forth in claim 31 wherein said step of clipping causes said clip for each said member to overlap part of a wire reinforcing means of said hose to thereby clip that said one member to that said part of said wire reinforcing means.

33. A method as set forth in claim 22 wherein said step of connecting each of said members to said hose end comprises the step of sewing each said member to said hose end with at least one stitch whereby said stitches comprise said auxiliary connecting means.

34. A method as set forth in claim 33 wherein said step of sewing causes said stitch for each said member to overlap part of a wire reinforcing means of said hose to thereby sew that said one member to that said part of said wire reinforcing means.

35. A method as set forth in claim 22 wherein said step of connecting each of said members to said hose end comprises the step of securing each said member to said hose end with adhesive means whereby said adhesive means comprise said auxiliary connecting means.

36. A method as set forth in claim 35 wherein said step of securing causes said adhesive means for each said member to overlap part of a wire reinforcing means of said hose to thereby secure that said one member to that said part of said wire reinforcing means.

37. A method as set forth in claim 22 wherein said step of connecting each of said members to said hose end comprises the step of riveting each said member to said hose end with at least one rivet whereby said rivets comprise said auxiliary connecting means.

38. A method as set forth in claim 37 wherein said step of riveting causes said rivet for each said member to overlap part of a wire reinforcing means of said hose to thereby rivet that said one member to that said part of said wire reinforcing means.

39. A method as set forth in claim 22 wherein said step of connecting each of said members to said hose end comprises the step of ultrasonically welding a portion of each said member to a portion of said hose end whereby said welded portions comprise said auxiliary connecting means.

40. A method as set forth in claim 39 wherein said step of welding causes said welded portion for each said member to overlap part of a wire reinforcing means of said hose to thereby weld that said one member to that said part of said wire reinforcing means.

* * * * *